(12) United States Patent
Depiere et al.

(10) Patent No.: US 11,193,851 B2
(45) Date of Patent: Dec. 7, 2021

(54) METHOD FOR DETECTING A LEAK IN A LIQUID LINE, AND WATER METER HAVING A CONTROLLER FOR CARRYING OUT THE METHOD

(71) Applicant: Grohe AG, Hemer (DE)

(72) Inventors: Bert Depiere, Wakkerzeel (BE); Waldemar Gaida, Duesseldorf (DE); Heiko Schoenbeck, Hemer (DE); Achim Mielke, Porta Westfalica (DE); Torsten Meier, Neuss (DE); Daniel Radermacher, Duesseldorf (DE)

(73) Assignee: Grohe AG, Hemer (DE)

( * ) Notice: Subject to any disclaimer, the term of this patent is extended or adjusted under 35 U.S.C. 154(b) by 73 days.

(21) Appl. No.: 16/819,530

(22) Filed: Mar. 16, 2020

(65) Prior Publication Data

US 2020/0217744 A1 Jul. 9, 2020

Related U.S. Application Data

(63) Continuation of application No. PCT/EP2018/074027, filed on Sep. 6, 2018.

(30) Foreign Application Priority Data

Sep. 15, 2017 (DE) .................... 10 2017 121 489.5

(51) Int. Cl.
*G01M 3/28* (2006.01)
*E03B 7/07* (2006.01)
*F17D 5/00* (2006.01)

(52) U.S. Cl.
CPC .......... *G01M 3/2815* (2013.01); *E03B 7/071* (2013.01)

(58) Field of Classification Search
CPC ........ G01M 3/26; G01M 3/28; G01M 3/2815; E03B 7/071; F17D 5/00; F17D 5/06
See application file for complete search history.

(56) References Cited

U.S. PATENT DOCUMENTS 4,735,231 A * 4/1988 Jacquet ..................... F17D 5/02
137/459

FOREIGN PATENT DOCUMENTS

| WO | WO-8901112 A1 * | 2/1989 | ............... F17D 5/06 |
| WO | WO2014203246 A2 | 12/2014 | |

OTHER PUBLICATIONS

International Search Report dated Jan. 7, 2019 in corresponding application PCT/EP2018/074027.

* cited by examiner

*Primary Examiner* — Nguyen Q. Ha
(74) *Attorney, Agent, or Firm* — Muncy, Geissler, Olds & Lowe, P.C.

(57) ABSTRACT

A method for detecting a leak, having at least the following steps: a) capturing a flow volume of a liquid through a liquid line during a multiplicity of liquid removal processes; b) comparing the flow volumes of the liquid in the respective liquid removal processes with an alarm value; c) outputting an alarm signal if the flow volume of the liquid in a liquid removal process exceeds the alarm value; d) adapting the alarm value on the basis of a frequency of the occurrence of the flow volumes of the liquid in the liquid removal processes above an adaptation value.

10 Claims, 4 Drawing Sheets

METHOD FOR DETECTING A LEAK IN A LIQUID LINE, AND WATER METER HAVING A CONTROLLER FOR CARRYING OUT THE METHOD

This nonprovisional application is a continuation of International Application No. PCT/EP2018/074027, which was filed on Sep. 6, 2018, and which claims priority to German Patent Application No. 10 2017 121 489.5, which was filed in Germany on Sep. 15, 2017, and which are both herein incorporated by reference.

BACKGROUND OF THE INVENTION

Field of the Invention

The present invention relates to a method for detecting a leak in a liquid line and to a water meter having a controller for carrying out the method. The invention serves in particular to prevent water damage caused by escaping liquids.

Description of the Background Art

A large number of water pipes are routinely installed in buildings; these pipes run from a liquid source, such as, for example, a water supply network, to various consumers, such as, for example, sanitary fittings, dishwashers, or washing machines. Leaks can occur in these liquid lines, for example, in the form of pipe breaks or cracks through which liquid can escape. The escaping liquid at the exit points can lead to major damage to the building, masonry, and/or fixtures of the building.

Leaks with large liquid discharges, such as those occurring, for example, in pipe breaks, can be detected, for example, by means of flow sensors. Such flow sensors require a very large measuring range of up to 100 L/min (liters per minute). This has the consequence that flow sensors are not suitable for determining small liquid discharges, in particular of less than 0.8 L/min, as occur, for example, in the case of drip leaks. Such drip leaks can therefore remain undetected for a long time, so that the escaping liquid can cause considerable damage, for example, due to mold formation.

In addition, threshold values for a flow rate of the liquid can be observed, which, if exceeded, are assumed to indicate a pipe break. To avoid false alarms, these threshold values must be set comparatively high. Therefore, these methods cannot detect leaks in which smaller quantities of liquid arise than in the event of a pipe break.

It is problematic further to distinguish between leaks and liquid consumption typically occurring in supply units, such as, for example, an apartment, a hotel room, or a building.

SUMMARY OF THE INVENTION

It is therefore an object of the present invention to provide a method for detecting a leak in a liquid line with which leaks can be detected with a higher reliability. In addition, a water meter is also to be provided by means of which leaks can be detected with a higher reliability.

In an exemplary embodiment, a method is provided for detecting a leak, which includes, for example, capturing a flow volume of a liquid through a line during a multiplicity of liquid removal processes; comparing the flow volumes of the liquid in the respective liquid removal processes with an alarm value; outputting an alarm signal if the flow volume of the liquid in a liquid removal process exceeds the alarm value; and adapting the alarm value on the basis of an (absolute or relative) frequency of the occurrence of the flow volumes of the liquid in the liquid removal processes above an adaptation value.

The method is used to detect a leak in a liquid line, which in particular runs at least partially in a building from a liquid source, such as, for example, a public water supply network, to at least one consumer, such as, for example, a sanitary fitting, dishwasher, or washing machine. The liquid line in particular can be formed at least partially of metal, such as, for example, copper. The liquid line or pipe system in addition has in particular a diameter of 10 mm (millimeters) to 30 mm.

In order to detect a leak in the liquid line, a flow volume of a liquid through a line is captured in a large number of liquid removal processes. A liquid removal process can be carried out, for example, by a liquid consumption process, such as, for example, removing the liquid from a sanitary fitting, using a washing machine, using a toilet, and/or using a shower. A single liquid removal process can be considered as "started" when a flow rate of the liquid through the liquid line increases from 0 L/min (liters per minute) to a positive value. A single liquid removal process can be considered as "finished" when the flow rate of the liquid through the liquid line drops again to 0 L/min. Therefore, if several of the consumption processes overlap in time, they are considered as a single liquid removal process. For each liquid removal process, the flow volume of the liquid through the liquid line is captured, therefore, the quantity of liquid flowing through the liquid line during a liquid removal process.

For this purpose, in particular a duration of the liquid removal process or a flow duration of the liquid through the liquid line for each liquid removal process and the (in particular average) flow rate of the liquid through the liquid line during the liquid removal process can be captured. The flow volume, the duration of the liquid removal process, the flow duration of the liquid through the liquid line per liquid removal process, and/or the (in particular average) flow rate of the liquid through the liquid line during the liquid removal process can be stored as a data record for each liquid removal process, for example, in an (electronic) storage device. Flow sensors and/or time measuring devices, for example, can be used to capture these values.

Each liquid removal process can be represented as a point in a (scatter) diagram or consumption field. The diagram is spanned by an x-axis and a y-axis, which are perpendicular to each other. In particular, the duration of the liquid removal process or the flow duration of the liquid through the liquid line per liquid removal process is plotted on the x-axis, for example, in minutes, and the (in particular average) flow rate of the liquid through the liquid line during the liquid removal process on the y-axis in L/min. The position of the point of the respective liquid removal process in the diagram is thus determined by the (in particular average) flow rate of the liquid through the liquid line and the duration of the liquid removal process or the flow duration of the liquid through the liquid line of the respective liquid removal process. Each liquid removal process can be saved thereby as an event in the diagram or the consumption field.

Then or subsequently, the flow volumes of the liquid in the respective liquid removal processes are compared with an alarm value. The alarm value is in particular a threshold value above which an abnormal or unexpectedly high consumption value for the monitored supply unit is assumed. The alarm value can be represented in the diagram as a graph and/or line, for example. The comparison between the flow volumes of the liquid in the respective liquid removal processes with the alarm value can thus (also) be carried out by comparing the relative position of the point of the respective liquid removal process with the graph or the line of the alarm value. For example, if the point of a liquid removal process is to the right of the graph or line of the alarm value, the flow volume of the liquid in the liquid removal process exceeds the alarm value. For example, if the point of the liquid removal process is to the left of the graph and/or the line of the alarm value, the flow volume of the liquid of the liquid removal process falls below the alarm value.

If the flow volume of the liquid in a liquid removal process exceeds the alarm value, an alarm signal is output. The alarm signal can be, for example, a message to a resident of the supply unit, a monitoring system, a control unit, and/or a control element of the liquid line. The message can be sent, for example, in the form of an electronic message to a mobile phone of the resident. In addition, the alarm signal can also be an acoustic and/or visual alarm signal, by means of which an unusual (in particular unexpectedly high) liquid consumption is signaled to the resident. The resident can then, for example, manually close a valve, by means of which the liquid line can be closed, in order to prevent the liquid from escaping from a possible leak. Furthermore, the valve can optionally also be closed automatically by means of a control signal. The valve can be, for example, a solenoid valve that can be actuated (automatically and/or electrically) in particular by a controller.

The alarm value can be adapted on the basis of an (absolute or relative) frequency of the occurrence of the flow volumes of the liquid in the liquid removal processes above an adaptation value. This means that it is first determined how often the flow volumes of the liquid in the individual liquid removal processes are above the (predefinable) adaptation value. If the frequency within a (predefinable) time period (for example, 6 hours) reaches, for example, a (predefinable) frequency value (for example, 50% of the flow volumes of the liquid in the individual liquid removal processes above the (predefinable) adaptation value), the alarm value can be increased, for example, by a (predefinable) value and/or factor (for example, 10%). This can mean that the graph or the line of the alarm value in the diagram is shifted to the right. If the frequency within the (predefinable) time period (for example, 6 hours) does not reach, for example, the (predefinable) frequency value or this is even "0" (i.e., none of the flow volumes of the liquid in the individual liquid removal processes are above the (predefinable) adaptation value), the alarm value can be reduced, for example, by a (predefinable) value or factor (for example, 10%). This can mean that the graph or the line of the alarm value in the diagram is shifted to the left. The adaptation value can thus be a threshold value, at the exceeding of which the alarm value is adapted with the (predefinable) frequency. In addition, the adaptation can in particular only be carried out if there is a minimum number of liquid removal processes, for example, at least 10 liquid removal processes. Furthermore, the adaptation can take place, for example, four times a day (for example, at 00:00, 06:00 a.m., 12:00 noon, and 6:00 p.m.). Furthermore, it can be provided that the adaptation value is never reduced below a (predefinable) minimum adaptation value and/or is never increased above a (predefinable) maximum adaptation value. The adaptation value can also be represented in the diagram as a graph and/or line, for example. For example, if the point of a liquid removal process is to the right of the graph or line of the adaptation value, the flow volume of the liquid in the liquid removal process exceeds the adaptation value. For example, if the point of the liquid removal process is to the left of the graph or the line of the adaptation value, the flow volume of the liquid in the liquid removal process falls below the adaptation value. The adaptation value is in particular lower than the alarm value. This also means, among other things, that the graph or the line of the adaptation value in the diagram is located in particular to the left of the graph or the line of the alarm value. The alarm value is thus adapted to the flow volumes of the liquid through the liquid line that typically occurs in the consumption unit in a liquid removal process, so that leaks can be detected with a higher reliability.

As already explained above, an (average) flow rate of the liquid and a flow duration of the liquid per liquid removal process can be captured. The (average) flow rate of the liquid and the flow duration of the liquid per liquid removal process can be captured (for each event) in a (scatter) diagram.

If the alarm value is adapted, the adaptation value can be adapted on the basis of the alarm value. This means in particular that the adaptation value is (also) increased or decreased when the alarm value is increased or decreased. For example, the adaptation value can be adapted by the same value or the same factor as the alarm factor. Furthermore, this can mean that the graph or the line of the adaptation value in the diagram is shifted in the same direction as the graph or the line of the alarm value and/or parallel to the graph or the line of the alarm value.

At least the adaptation value or the alarm value can be separately adapted for a plurality of ranges for the flow rate of the liquid. For this purpose, a plurality of ranges, for example, a low range, a medium range, and a high range, can be defined for the flow rate of the liquid for which the adaptation value and/or the alarm value can be adapted separately or individually.

The detection of leaks can comprise measuring a pressure of the liquid in the line. By measuring the pressure of the liquid in the line, for example, micro-leaks with flow rates of the liquid through the liquid line of, for example, below 0.8 L/min, preferably 0.05 L/min to 0.8 L/min, and/or drip leaks with a flow rate of the liquid through the liquid line of, for example, less than 0.2 L/h (liters per hour) can be detected. Such low flow volumes of such micro-leaks and drip leaks cannot be detected by already installed flow sensors. Drip leaks can in particular be detected once a day, for example, at a time when the flow rate of the liquid in the liquid line is regularly or usually 0 L/min. Furthermore, for the measurement of the pressure, a pressurized space in the liquid line can be formed by closing the valve, which can be a main water valve, for example. The valve can be closed, for example, for 30 seconds. If a consumption process is triggered during the measurement, this can be recognized by a very strong pressure drop in the pressurized space. In this case, the valve can be opened immediately and the measurement stopped. If a (small) pressure drop (of, for example, more than 500 mbar (millibar)) is determined in the pressurized space of the liquid line during two successive measurements, this indicates a drip leak. To detect a micro-leak, the pressure of the liquid in the liquid line can be measured several times a day, for example, ten times a day, wherein a measured pressure drop in several successive measuring processes, for example, three measuring processes, indicates an unusual constant passage of small flow volumes of the liquid through the liquid line and thus a leak. In both cases, an alarm signal can also be output.

It can be provided that the detection of leaks comprises measuring a flow rate of the liquid through the liquid line and an alarm signal is output when the flow rate of the liquid exceeds a first threshold value. The first threshold value can be, for example, 20 L/min to 100 L/min, preferably 50 L/min. If the measured flow rate of the liquid through the liquid line is above this (very high) first threshold value, this indicates a pipe break. In this case, the valve can be closed automatically and/or an alarm signal can be output.

An alarm signal can be output if the flow volume exceeds a second threshold value. In particular, an alarm signal is output if the flow volume in a single liquid removal process exceeds the second threshold value. The second threshold value can be, for example, 100 liters to 2000 liters, preferably 300 liters.

At least the first threshold value or the second threshold value can be adjustable. This means in particular that the first threshold value and/or the second threshold value can be adapted for different consumption units.

According to a further aspect, a water meter having a valve, a flow sensor for a liquid, and a pressure sensor for a liquid, which are connected in a data-conducting manner to a controller, is also provided, wherein the controller is configured to carry out a method described here.

Water consumption in particular in a consumption unit, such as, for example, a building, an apartment, or a hotel room can be determined by means of the water meter, so that a liquid, in particular water, can be billed according to the consumption. The water meter is in particular arranged in a liquid line, via which the liquid can be brought from a liquid source to at least one consumer. Furthermore, the water meter has a valve with which the liquid line can be closed, a flow sensor with which a liquid flow through the liquid line can be determined, and a pressure sensor with which a pressure or pressure curve in the liquid line can be determined; these are connected in a data-conducting manner (by cable connection and/or radio connection) to a controller. The controller is in particular a microcontroller. The controller is configured and provided for carrying out the method of the invention. For further details, reference is made to the description of the method of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
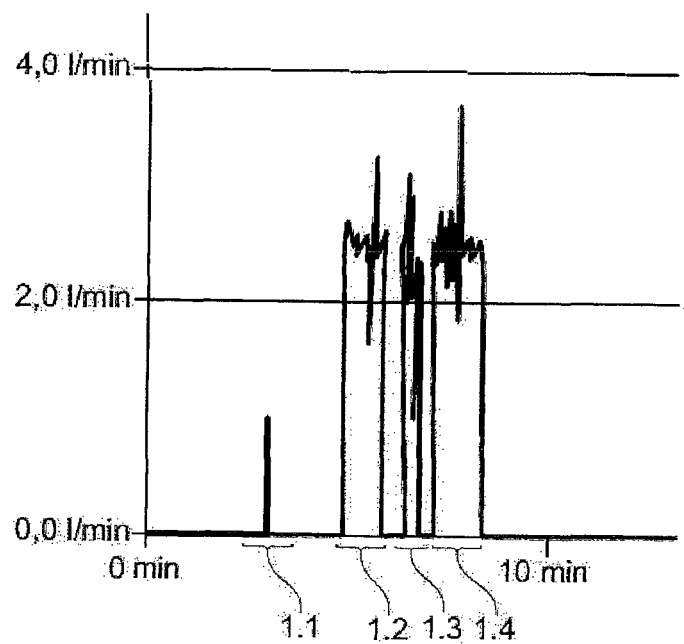
FIG. 1 is a representation of a course of a flow rate of a liquid through a liquid line.
Figure 7:
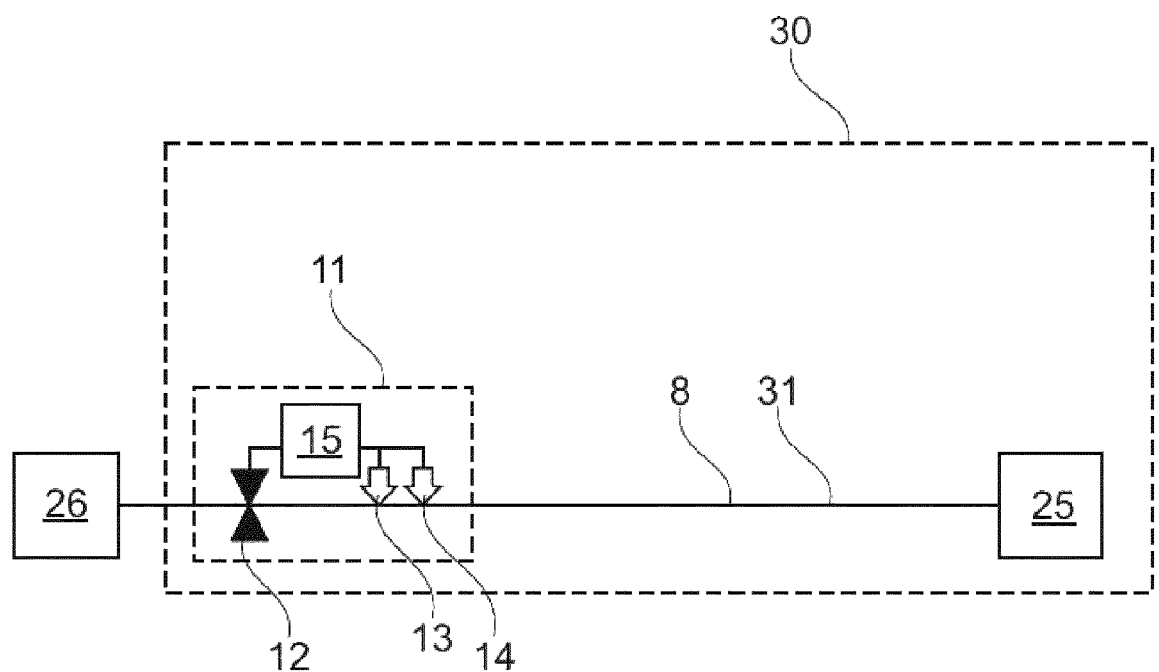
FIG. 7 shows schematic representation of a building with a water meter.

FIG. 1 shows a representation of a captured course of a flow rate of a liquid through a liquid line 8 (shown in FIG. 7). FIG. 1 here shows the flow rate of the liquid through the liquid line 8 in L/min over a certain period of time. Four liquid removal processes 1.1, 1.2, 1.3, and 1.4 (each as a separate event) can be seen, each with different durations and different flow rate curves.

Figure 2:
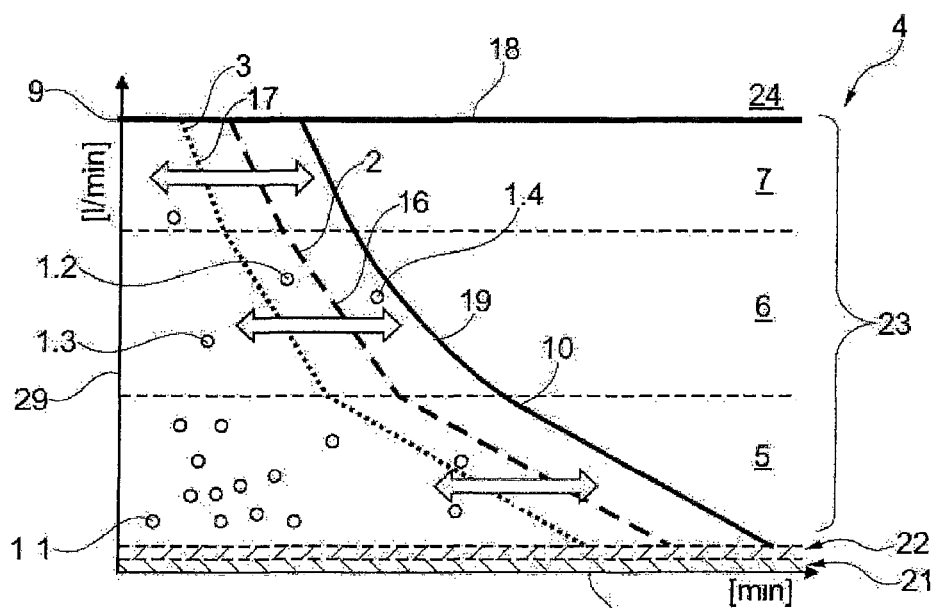
FIG. 2 shows a (scatter) diagram.

The four liquid removal processes 1.1, 1.2, 1.3, and 1.4 are shown as points in a diagram 4 in FIG. 2. Diagram 4 has an x-axis 28 on which the duration is plotted in minutes and a y-axis 29 on which the flow rate is plotted in L/min. The positions of the liquid removal processes 1.1, 1.2, 1.3, and 1.4 in diagram 4 thus result from the duration and the (average) flow rate of the liquids in the respective liquid removal processes 1.1, 1.2, 1.3, and 1.4. The flow rate of the liquids on the y-axis is divided into a first range 21, for example, a drip leak range, a second range 22, for example, a micro-leak range, a third range 23, for example, for medium flow rates, and a fourth range 24, for example, for high flow rates. The first range 21 extends, for example, from 0 L/min to 0.00333 L/min (0.2 L/h), the second range 22 from 0.00333 L/min (0.2 L/h) to 0.8 L/min, the third range 23 from 0.8 L/min to 50 L/min, and the fourth range 24 from 50 L/min to infinity. Third range 23 is in turn divided into a lower range 5, a middle range 6, and a high range 7. Lower range 5, middle range 6, and high range 7 can be evenly distributed over third range 23. Furthermore, lower range 5 can form approximately 40% of third range 23, middle range 6 approximately 40% of third range 23, and high range 7 approximately 20% of third range 23. In addition, lower range 5 can extend from 0.8 L/min to 20 L/min, middle range 6 from 20 L/min to 40 L/min, and high range 7 from 40 L/min to 50 L/min. A first line 16 for an alarm value 2, a second line 17 for an adaptation value 3, a horizontal third line 18 for a first threshold value 9 of the flow rate, and a fourth line 19 for a second threshold value 10 for a flow volume of the liquid through liquid line 8 are also shown in diagram 4. It can be seen that liquid removal processes 1.1 and 1.3 are to the left of first line 16 for alarm value 2 and to the left of second line 17 for adaptation value 3. This means that the flow volumes and flow rates of the liquid within liquid removal processes 1.1 and 1.3 are below alarm value 2 and adaptation value 3. Liquid removal process 1.4 is located to the right of first line 16 for alarm value 2. This means that the flow volume and flow rate of the liquid within liquid removal process 1.4 exceeds alarm value 2, so that an alarm signal is output. It can be seen further that liquid removal processes 1.2 and 1.4 are located to right of second line 17 of adaptation value 3. This means that the flow volumes and flow rate of the liquid within liquid removal processes 1.2 and 1.4 are above adaptation value 3. The frequency, for example, in the form a (relative or absolute) number, of the liquid removal processes is determined, which are located to the right of second line 17 of adaptation value 3. If the frequency exceeds a predefinable frequency value in a predefinable time period and/or after the capture of a predefinable number of captured liquid removal processes, an adaptation of alarm value 2 is carried out in the form of a shift of first line 16 to the right and/or reduction of the (already negative) slope of first line 16. If the frequency falls below a predefinable frequency value or is even 0, an adaptation of alarm value 2 is carried out in the form of a shift of first line 16 to the left and/or increase of the (negative) slope of first line 16. At the same time, when alarm value 2 or its first line 16 is adapted, a corresponding adaptation of adaptation value 3 or its second line 17 can take place, in which second line 17 is also shifted to the left or right and/or its slope is adjusted. After an adaptation, first line 16 of alarm value 2 could run in lower range 5, for example, from the xy coordinate 20 L/min/15 min to the xy coordinate 0.8 L/min/120 min, in middle range 6, for example, from the xy coordinate 40 L/min/7.5 min to the xy coordinate 20 L/min/15 min, and in the upper range 7, for example, from the xy coordinate 50 L/min/0 min to the xy coordinate 40 L/min/7.5 min. Further, after the adaptation, second line 17 of adaptation value could run in the lower range 5, for example, from the xy coordinate 20 L/min/0 min to the xy coordinate 0.8 L/min/72 min, in middle range 6, for example, from the xy coordinate 40 L/min/3 min to the xy coordinate 20 L/min/10.5 min, and in the upper range 7, for example, from the xy coordinate 50 L/min/0 min to the xy coordinate 40 L/min/6 min. Further possible adaptations of alarm value 2 and adaptation value 3 are shown schematically in FIGS. 3 to 6. If a liquid removal process 1.1, 1.2, 1.3, 1.4 is located above third line 18, its flow rate of the liquid in liquid line 8 exceeds first threshold value 9, which here is 50 L/min. This would indicate a pipe break, so that the valve 12 shown in FIG. 7 in liquid line 8 is automatically closed. In this case, a corresponding message can be sent to a resident of the consumption unit. Fourth line 19 represents a second threshold value 10, which here is 300 L. If a liquid removal process 1.1, 1.2, 1.3, 1.4 is located to the right of fourth line 19, its flow volume exceeds the maximum permissible flow volume per liquid removal process 1.1, 1.2, 1.3, 1.4, as a result of which valve 12 shown in FIG. 7 in liquid line 8 is also closed automatically. In this case, a corresponding message can also be sent to a resident of the consumption unit.

Figure 3:
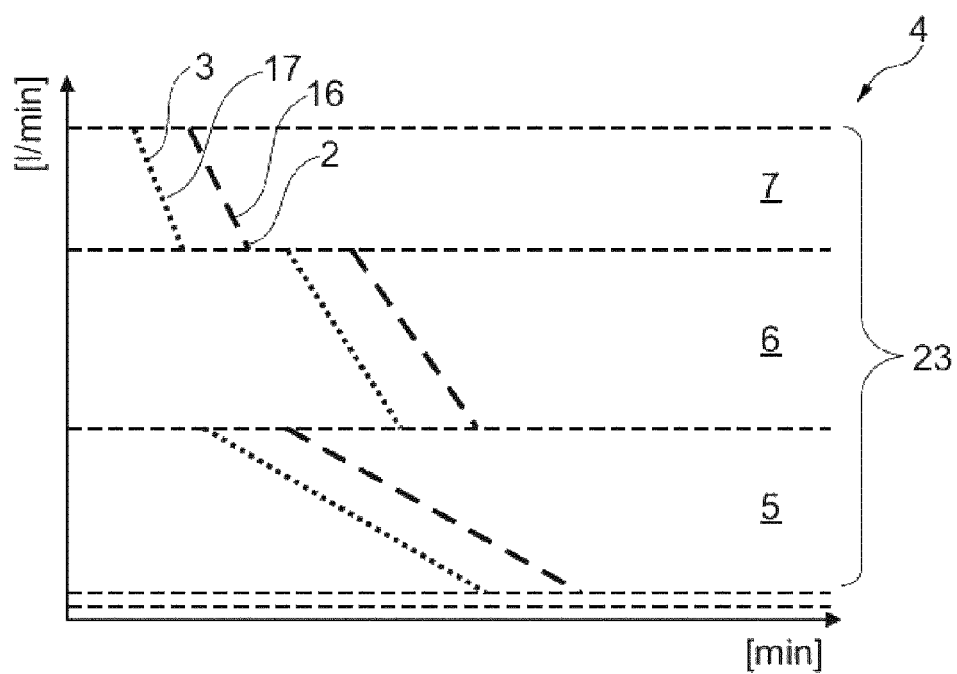
FIG. 3 shows the (scatter) diagram with a first adaptation of the alarm value and the adaptation value.

FIG. 3 shows diagram 4 after a first adaptation of alarm value 2 or its first line 16 and of adaptation value 3 or its second line 17. The adaptation here is carried out separately for lower range 5, middle range 6, and upper range 7 of third range 23, depending on the frequency of liquid removal processes 1.1, 1.2, 1.3, 1.4 located in ranges 5, 6, and 7 to the right of second line 17 of adaptation value 3 (not shown in FIG. 3). First line 16 and second line 17 run parallel to one another in the respective ranges 5, 6, 7 and are at the same (horizontal) distance as before the adaptation. First line 16 and second line 17 run in ranges 5, 6, 7 such that they no longer touch at the borders between ranges 5 and 6 and between ranges 6 and 7.

Figure 4:
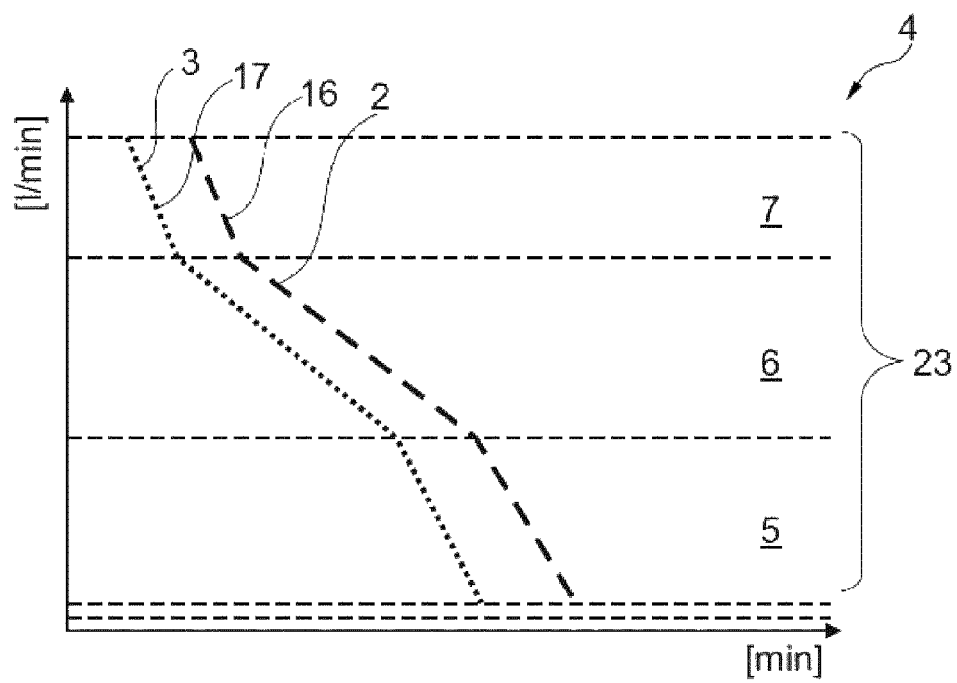
FIG. 4 shows the (scatter) diagram with a second adaptation of the alarm value and the adaptation value.

FIG. 4 shows diagram 4 after a second adaptation of alarm value 2 or its first line 16 and of adaptation value 3 or its second line 17. The adaptation here is also carried out separately for lower range 5, middle range 6, and upper range 7 of third range 23, depending on the frequency of liquid removal processes 1.1, 1.2, 1.3, 1.4 located in ranges 5, 6, and 7 to the right of second line 17 of adaptation value 3 (not shown in FIG. 4). First line 16 and second line 17 run parallel to one another in the respective ranges 5, 6, 7 and are at the same (horizontal) distance as before the adaptation. First line 16 and second line 17 run in ranges 5, 6, 7 such that they continue to touch at the borders between ranges 5 and 6 and between ranges 6 and 7.

Figure 5:
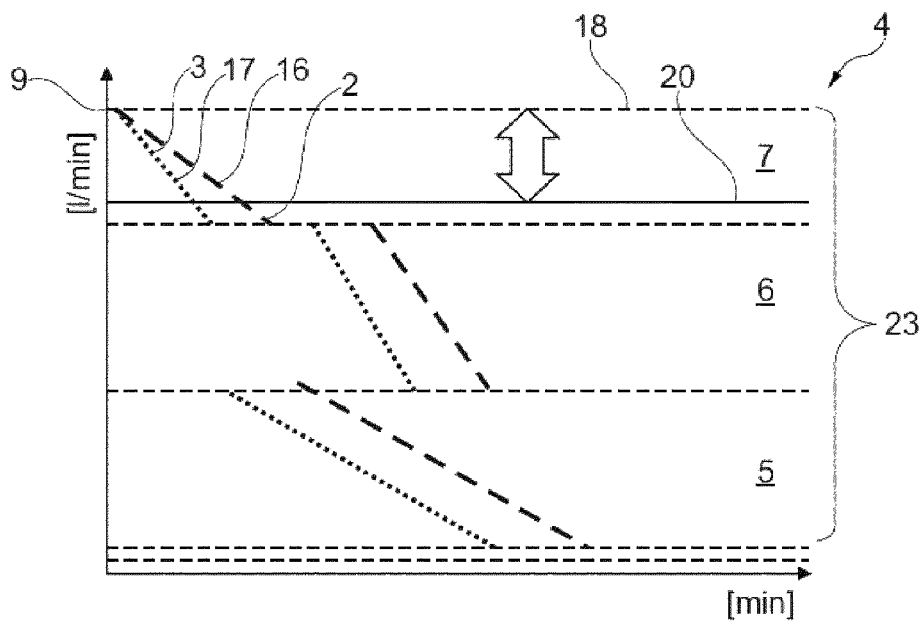
FIG. 5 shows the (scatter) diagram with a third adaptation of the alarm value and the adaptation value.

FIG. 5 shows diagram 4 after a third adaptation of alarm value 2 or its first line 16 and of adaptation value 3 or its second line 17. The adaptation here is also carried out separately for lower range 5, middle range 6, and upper range 7 of third range 23, depending on the frequency of liquid removal processes 1.1, 1.2, 1.3, 1.4 located in ranges 5, 6, and 7 to the right of second line 17 of adaptation value 3 (not shown in FIG. 5). First line 16 and second line 17 run parallel to one another only in ranges 5 and 6 and are at the same (horizontal) distance as before the adaptation. First line 16 and second line 17 do not run parallel to one another in upper range 7. First line 16 and second line 17 run in ranges 5, 6, 7 such that they do not touch at the borders between ranges 5 and 6 and between ranges 6 and 7. Furthermore, a fifth line 20 is shown in FIG. 5. If liquid removal processes 1.1, 1.2, 1.3, 1.4 are above fifth line 20 with a frequency above a predefinable frequency value, the height of third line 18, i.e., the value for first threshold value 9, can be adjusted depending on the frequency.

Figure 6:
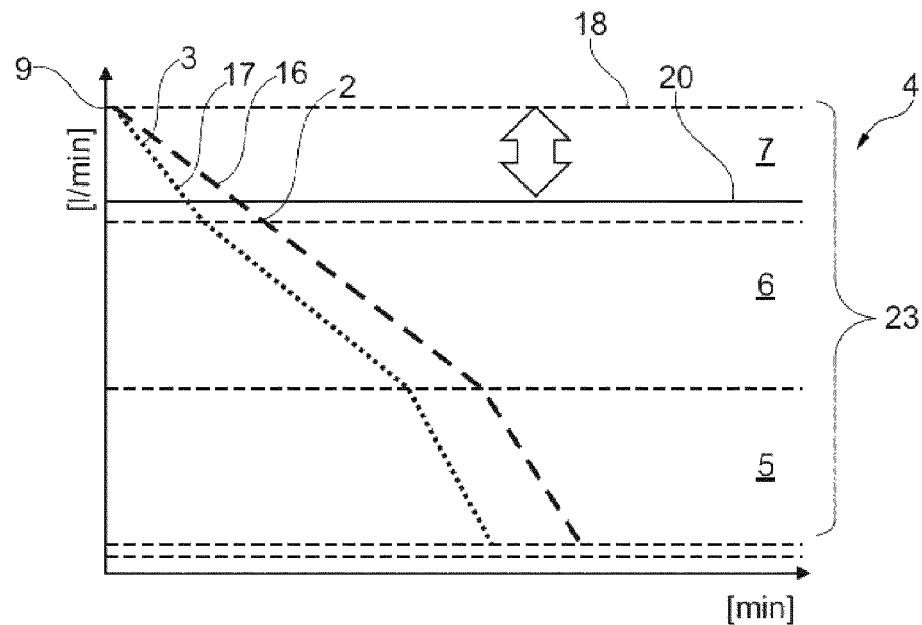
FIG. 6 shows the (scatter) diagram with a fourth adaptation of the alarm value and the adaptation value.

FIG. 6 shows diagram 4 after a fourth adaptation of alarm value 2 or its first line 16 and of adaptation value 3 or its second line 17. The adaptation here is also carried out separately for lower range 5, middle range 6, and upper range 7 of third range 23, depending on the frequency of liquid removal processes 1.1, 1.2, 1.3, 1.4 located in ranges 5, 6, and 7 to the right of second line 17 of adaptation value 3 (not shown in FIG. 6). First line 16 and second line 17 run parallel to one another only in ranges 5 and 6 and are at the same (horizontal) distance as before the adaptation. First line 16 and second line 17 do not run parallel to one another in upper range 7. First line 16 and second line 17 run in ranges 5, 6, 7 such that they touch at the borders between ranges 5 and 6 and between ranges 6 and 7. Furthermore, fifth line 20 is also shown in FIG. 6. If liquid removal processes 1.1, 1.2, 1.3, 1.4 are above fifth line 20 with a frequency above a predefinable frequency value, the height of third line 18, i.e., the value for first threshold value 9, can be adjusted depending on the frequency.

FIG. 7 schematically shows a consumption unit 30 in the form of a building with a water meter 11. Water meter 11 is arranged in a liquid line 8, by means of which liquid can be brought from a liquid source 26 to a consumer 25. Water meter 11 has a valve 12 in the manner of a solenoid valve, by means of which liquid line 8 can be closed to form a pressurized space 31 in liquid line 8. Pressurized space 31 extends from valve 12 to consumer 25. Furthermore, water meter 11 has a pressure sensor 14, by means of which a pressure and thus a pressure drop in pressurized space 31 after the closing of liquid line 8 by valve 12 can be determined. The closing of liquid line 8 by valve 12 takes place when it has been determined by a flow sensor 13 of water meter 11 that consumer 25 does not remove any liquid via liquid line 8 from liquid source 26. Valve 12, flow sensor 13, and pressure sensor 14 are connected to a controller 15 of water meter 11 in a data-conducting manner, wirelessly, or by a radio connection. Controller 15 is configured and provided for carrying out the method of the invention.

Leaks can be detected with a higher reliability with the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A method for detecting a leak, the method comprising:
 capturing a flow volume of a liquid through a liquid line during a plurality of liquid removal processes;

comparing the flow volumes of the liquid in the respective liquid removal processes with an alarm value;

outputting an alarm signal if the flow volume of the liquid in a liquid removal process exceeds the alarm value; and adapting the alarm value based on a frequency of the occurrence of the flow volumes of the liquid in the liquid removal processes above an adaptation value.

2. The method according to claim 1, wherein a flow rate of the liquid and a flow duration of the liquid per liquid removal process are captured.

3. The method according to claim 2, wherein the flow rate of the liquid and the flow duration of the liquid per liquid removal process are captured in a diagram.

4. The method according to claim 2, wherein, if the alarm value is adapted, the adaptation value is adapted on the basis of the alarm value.

5. The method according to claim 2, wherein at least the adaptation value or the alarm value are separately adapted for a plurality of ranges for the flow rate of the liquid.

6. The method according to claim 1, wherein the detection of leaks comprises measuring a pressure of the liquid in the liquid line.

7. The method according to claim 1, wherein the detection of leaks comprises measuring a flow rate of the liquid through the liquid line and wherein an alarm signal is output when the flow rate of the liquid exceeds a first threshold value.

8. The method according to claim 1, wherein an alarm signal is output if the flow volume exceeds a second threshold value.

9. The method according to claim 7, wherein the first threshold or the second threshold is adjustable.

10. A water meter comprising:

a valve;

a flow sensor for a liquid; and a pressure sensor for the liquid, wherein the flow sensor and the pressure sensor are connected in a data-conducting manner to a controller, and wherein the controller is configured to carry out the method according to claim 1.

* * * * *